(12) United States Patent
Mallary

(10) Patent No.: US 8,917,581 B1
(45) Date of Patent: Dec. 23, 2014

(54) SELF-ANNEAL PROCESS FOR A NEAR FIELD TRANSDUCER AND CHIMNEY IN A HARD DISK DRIVE ASSEMBLY

(71) Applicant: Western Digital Technologies, Inc., Irvine, CA (US)

(72) Inventor: Michael L. Mallary, Sterling, MA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/158,754

(22) Filed: Jan. 17, 2014

Related U.S. Application Data

(60) Provisional application No. 61/917,799, filed on Dec. 18, 2013.

(51) Int. Cl.
*G11B 11/00* (2006.01)

(52) U.S. Cl.
USPC ........................ 369/13.33; 428/811

(58) Field of Classification Search
None
See application file for complete search history.

(56) References Cited

U.S. PATENT DOCUMENTS

| | | | |
|---|---|---|---|
| 4,814,578 A | 3/1989 | Tuckerman | |
| 5,868,951 A | 2/1999 | Schuck, III et al. | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |
| 6,134,089 A | 10/2000 | Barr et al. | |
| 6,136,166 A | 10/2000 | Shen et al. | |
| 6,137,661 A | 10/2000 | Shi et al. | |
| 6,137,662 A | 10/2000 | Huai et al. | |
| 6,160,684 A | 12/2000 | Heist et al. | |
| 6,163,426 A | 12/2000 | Nepela et al. | |
| 6,166,891 A | 12/2000 | Lederman et al. | |
| 6,173,486 B1 | 1/2001 | Hsiao et al. | |
| 6,175,476 B1 | 1/2001 | Huai et al. | |
| 6,178,066 B1 | 1/2001 | Barr | |
| 6,178,070 B1 | 1/2001 | Hong et al. | |

(Continued)

*Primary Examiner* — Paul Huber

(57) ABSTRACT

Articles of manufacture and methods of manufacturing such articles of manufacture are disclosed. The articles of manufacture may include a heat assisted magnetic recording (HAMR) transducer having a near field transducer (NFT) and a chimney thermally coupled to the NFT. The articles of manufacture may also include an electrical conductor having section with a reduced width that is thermally coupled to the chimney. The methods include applying an electrical current to the electrical conductor to generate heat in the section and annealing the chimney and the NFT from the heat generated.

26 Claims, 5 Drawing Sheets

(56) References Cited

U.S. PATENT DOCUMENTS

| | | |
|---|---|---|
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,221,750 B1 | 4/2001 | Fjelstad |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |

(56) References Cited

U.S. PATENT DOCUMENTS

| | | |
|---|---|---|
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 6,998,278 B2 | 2/2006 | Silverbrook |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |

(56) References Cited

U.S. PATENT DOCUMENTS

| | | |
|---|---|---|
| 7,698,806 B2 | 4/2010 | Bonin et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,773,330 B2 * | 8/2010 | Itagi et al. ..................... 360/59 |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B2 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,409,888 B2 | 4/2013 | Rumpler et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |

(56) References Cited

U.S. PATENT DOCUMENTS

| | | |
|---|---|---|
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 2004/0046148 A1 | 3/2004 | Zhang et al. |
| 2004/0124438 A1 | 7/2004 | Mukherjee et al. |
| 2010/0290157 A1 | 11/2010 | Zhang et al. |
| 2011/0086240 A1 | 4/2011 | Xiang et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0330573 A1* | 12/2013 | Zhao et al. ............ 428/814 |
| 2014/0050058 A1* | 2/2014 | Zou et al. ............ 369/13.33 |
| 2014/0154529 A1 | 6/2014 | Yang et al. |
| 2014/0175050 A1 | 6/2014 | Zhang et al. |

\* cited by examiner

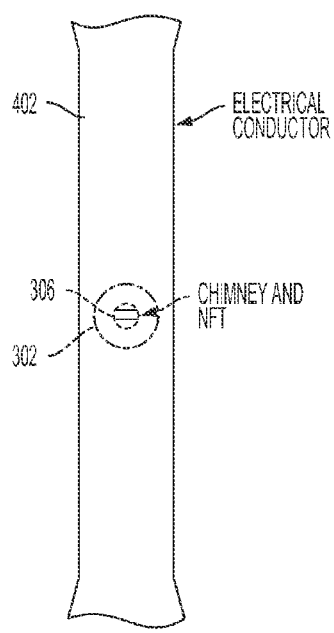
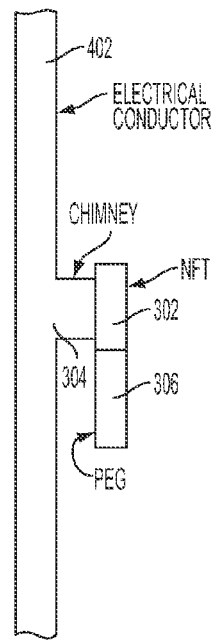
FIG. 5A
FIG. 5B

US 8,917,581 B1

SELF-ANNEAL PROCESS FOR A NEAR FIELD TRANSDUCER AND CHIMNEY IN A HARD DISK DRIVE ASSEMBLY

CROSS-REFERENCE TO RELATED APPLICATION

This application claims the benefit of U.S. Provisional Application Ser. No. 61/917,799, filed on Dec. 18, 2013, which is expressly incorporated by reference herein in its entirety.

BACKGROUND

The disclosure relates to energy assisted magnetic recording transducers or hard disk drives.

A conventional heat assisted magnetic recording (HAMR) transducer is used in writing data to a recording media. The conventional HAMR receives light, or energy, from a conventional laser, which may be a diode laser, for example. The current areal data density using HAMR is about 1 Tb/in$^{-2}$. The HAMR is conventionally bonded to a slider that rides on an air bearing surface of the recording media. The slider is attached to an arm that rotates to provide the slider and HAMR access to write tracks on the media at different radii.

The surface plasmon effect may be applied in a near-field transducer (NFT) to write data bits of smaller dimension than with conventional HAMR, on the order of 70 nm or less, but with higher heat energy density, increasing the possible areal data density that may be written to a magnetic disk. It is estimated that areal densities approaching 3 Tb/in$^{-2}$ are possible.

The NFT is effective in heating high magnetic anisotropy materials for about 1 nsec above the phase transition temperature to briefly lower the high coercivity, enabling the write head to record data that becomes stable once the heated bit region cools to ambient. The small size of the data bit translates into a large increase of storage density as compared to current areal densities of about 1 Tbm$^{-2}$.

However, because of the intensity of the resonant electromagnetic field that builds up in the NFT, the accumulated heat concentration may cause migration of the NFT material, thereby degrading the effectiveness of a HAMR. In-process anneals and better alloys have been proposed to mitigate this problem but studies indicate the need for anneals at greater than 200° C. However the disk reader and hard baked photoresist structures of the hard disk drive may degrade for >200° C. Local heating with a laser spot has been proposed but may not be economic and readily reduced to practice. Therefore a local annealing technique is needed.

BRIEF DESCRIPTION OF THE DRAWINGS

Various aspects of the present invention will now be presented in the detailed description by way of example, and not by way of limitation, with reference to the accompanying drawings, wherein:

FIG. 5A is a plan view illustrating an exemplary embodiment of the narrow section of the electrical conductor on a surface of the HAMR transducer directly over the chimney and NFT.

FIG. 5B is a cross-section view of the exemplary embodiment shown FIG. 5A.

DETAILED DESCRIPTION

Figure 1:
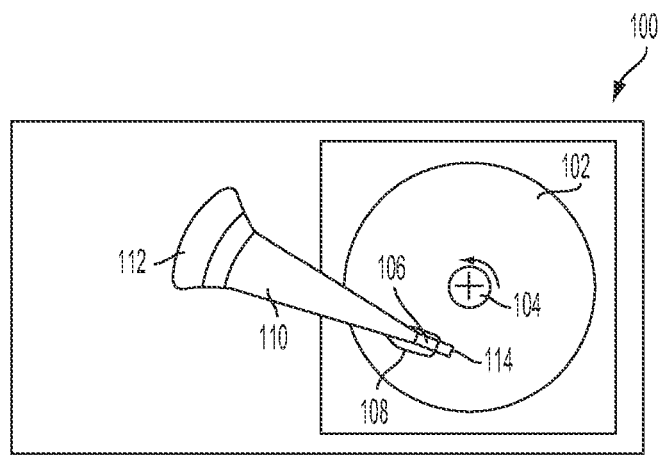
FIG. 1 is a conceptual view of an exemplary embodiment of a HAMR disk drive.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus, method or article of manufacture does not require that all embodiments of the invention include the described components, structure, features, functionality, processes, advantages, benefits, or modes of operation.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises," "comprising," "includes," and/or "including," when used herein, specify the presence of the stated features, integers, steps, operations, elements, and/or components, but do not preclude the presence or addition of one or more other features, integers, steps, operations, elements, components, and/or groups thereof.

In the following detailed description, various aspects of the present invention will be presented in the context of a process for locally annealing a heat sinking chimney and near field transducer (NFT) in a HAMR transducer for hard disk drive read/write assemblies. However, those skilled in the art will realize that these aspects may be extended to other materials or components in other apparatus or articles of manufacture. Accordingly, any reference to a process for annealing a heat sinking chimney and NFT in a HAMR transducer is intended only to illustrate the various aspects of the present invention, with the understanding that such aspects may have a wide range of applications.

Various aspects of articles of manufacture and methods of manufacturing such articles of manufacture are disclosed. The articles of manufacture may include a HAMR transducer having an NFT and a chimney thermally coupled to the NFT. The articles of manufacture may also include an electrical conductor having section with a reduced width that is thermally coupled to the chimney. The methods include applying an electrical current to the electrical conductor to generate heat in the section and annealing the chimney and the NFT from the heat generated.

Various aspects of articles of manufacture and methods of manufacturing such articles of manufacture in batch are also disclosed. The articles of manufacture may include an array of HAMR transducers each having a near field transducer (NFT) and a chimney thermally coupled to the NFT. The articles of manufacture may further include an array of electrical conductors arranged with the array of HAMR transducers with each of the electrical conductors having section with a reduced width that is thermally coupled to a respective one of the chimneys. The methods include applying an electrical current to the electrical conductors to generate heat in their respective sections, and annealing the chimneys and the NFTs from the heat generated.

It is understood that other aspects of apparatus, articles of manufacture and methods will become readily apparent to those skilled in the art from the following detailed description, wherein various aspects of articles of manufacture and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

FIG. 1 is a conceptual view of an exemplary embodiment of a HAMR disk drive. The HAMR disk drive 100 is shown with a rotatable magnetic disk 102. The magnetic disk 102 may be rotated on a spindle 104 by a disk drive motor (not shown) located under the magnetic disk 102. A head 106 may include read and write poles (not shown) that detect and modify the magnetic polarization of the recording layer on the disk's surface. The head 106 is generally integrally formed with a slider 108. The function of the slider 108 is to support the head 106 and any electrical connections between the head 106 and the rest of the HAMR disk drive 100. The slider 108 is mounted to a positioner arm 110 which may be used to move the head 106 on an arc across the rotating magnetic disk 102, thereby allowing the head 106 to access the entire surface of the magnetic disk 102. The arm 110 may be moved using a voice coil actuator 112 or by some other suitable means.

The slider 108 is aerodynamically designed to fly above the magnetic disk 102 by virtue of an air bearing created between the surface of the slider 106 and the rotating magnetic disk 102. This surface of the slider 108 is referred to as an air bearing surface (ABS). The ABS is the portion of the slider 108 surface which is closest to the rotating magnetic disk 102, which is typically the head 104. A HAMR transducer 114 may be coupled to the distal end of the slider 108 to assist writing data to the magnetic disk 102. The HAMR transducer 114 includes an NFT (not shown) aligned with the ABS of the slider 108. Light from a laser is coupled to the HAMR transducer 114 and guided by waveguide (not shown) to the NFT. The NFT focuses (or concentrates) the light to the magnetic disk 102, and heats a small region of the media. The head 106 magnetically writes data to the heated region of the media by energizing the write pole. When the laser, as the heat source, is turned off, the localized magnetic media cools and the written bit becomes thermally stable at ambient temperature.

Figure 2:
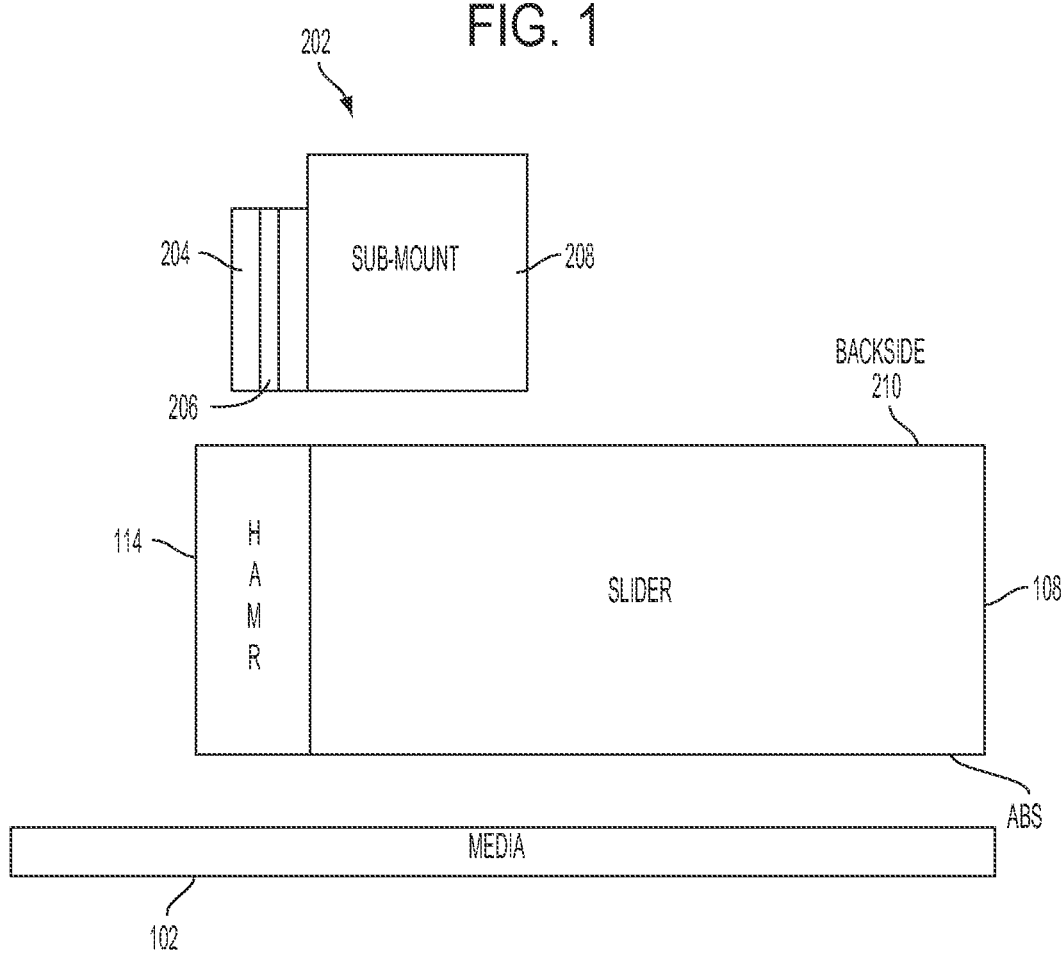
FIG. 2 is a conceptual view of an exemplary embodiment of a HAMR transducer arranged with a slider for a HAMR disk drive.

FIG. 2 is a conceptual view of an exemplary embodiment of a HAMR transducer arranged with a slider for a HAMR disk drive. The HAMR disk drive 100 includes the magnetic disk 102, a subassembly 202 and a slider 108 on which a HAMR transducer 114 is formed. The subassembly 202 includes a light source, such as a laser diode 204 having an emission exit 206, attached to a submount 208. The slider 108 has a back side 210 to which the submount 208 may be bonded, and an ABS. In the embodiment shown, the back side 210 is opposite to the ABS. However, in other embodiments, the back side 210 (i.e, the side to which the submount is bonded) may not be opposite to the ABS.

A surface plasmon effect may be applied in the NFT (not shown) to potentially increase areal data density that may be written to a magnetic disk 102. Surface plasmons (SPs) are collective oscillations of surface charge that are confined to an interface between a dielectric and a metal. When SPs are resonantly excited by an external optical field, the field amplitude in the vicinity of the surface may be orders of magnitude greater than that of the incident field. Moreover, the region of enhanced field may be tightly confined to a spot much smaller than the incident wavelength, e.g., on the order of 70 nm or less. Gold is a suitable plasmonic material for wavelengths longer than ~700 nm as it is chemically inert with a relatively high melting point.

A gold NFT that is excited at a SP resonance can couple light even more efficiently into a nearby medium by including a sharp tip in its design to take advantage of a "lightning rod" effect. A "lollipop" NFT may include a disk and a peg, where the peg acts as the sharp tip. At resonance the surface charge oscillates along the length of the lollipop peg to generate an electric field at the tip of the peg that couples energy into the magnetic disk 102. The peg provides the lightning rod effect for field confinement. A plasmonic metal beneath the recording layer of the magnetic disk 102 acts as both a heat sink and an image plane for the electric field. The recording layer is effectively within the gap of two nanoparticles, i.e., where the two nanoparticles constitute the NFT and its (virtual charge) image, resulting in good coupling efficiency and further confinement of the electric field.

Figure 3:
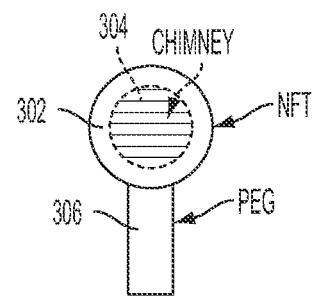
FIG. 3 is a plan view of an exemplary embodiment of an NFT.

FIG. 3 is a cross-section view of an exemplary embodiment of an NFT 302402. The NFT 302 is arranged as a disk in thermal and electrical contact with the peg 304. In operation, the NFT 302 is excited by light directed at it, typically by a laser, such as a laser diode, through an optical waveguide (not shown). The excitation is a resonant surface plasmon, in which the intensity of the evanescent field at the surface of the disk is enhanced relative to the field intensity of the illuminating light. The relatively intensified evanescent field is coupled down the length of the peg 304, where the tip of the peg 304 faces toward the ABS of the HAMR transducer 114 (see FIG. 2). This results in a lightning rod effect, which may produce a large electromagnetic field at the surface of the magnetic recording media, which absorbs and dissipates enough energy to raise the media temperature locally and reduce the magnetic coercivity in a high localized area corresponding to the dimensions of the peg 304.

The NFT 302 may be arranged with a heat removal, or heat sinking "chimney" 306. The chimney 306 may be made of gold because of the thermal conductivity properties of the metal. The NET 302 and chimney 306 may be partially or completely encapsulated in ceramics ($SiO_2$ and $Al_2O_3$), oxides or other materials commonly used for optical waveguides and electrical insulation. To mitigate the effects of atomic migration of gold due to localized heating of the NFT 302 and chimney 306, an electrical conductor may be deposited over the HAMR transducer during the manufacturing process. In a manner to be described later, the electrical conductor may act as a heater by passing an electrical current through it. In accordance with the present embodiment, the heat generated by the electrical conductor anneals the NFT 302 and the chimney 306.

Figure 4:
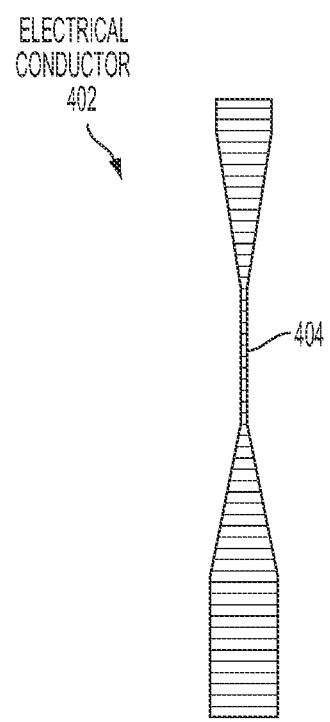
FIG. 4 is a plan view of an exemplary embodiment of an electrical conductor for annealing an NFT and chimney heat sink during the manufacturing process.

FIG. 4 is a plan view of an exemplary embodiment of an electrical conductor 402, which passes over the chimney heat sink and NFT for annealing when an electrical current passes through. The electrical conductor 402 has a section 404 with a reduced width that is electrically coupled to the chimney during the annealing process. The reduced width increases the resistance of the portion of the electrical conductor 402 localized at the chimney, and therefore causes localized joule heating when an electrical current is applied.

FIG. 5A is a plan view illustrating an exemplary embodiment of the narrow section of the electrical conductor on a surface of the HAMR transducer directly over the chimney 306 and NFT 302, where both are shown with dotted lines to indicate that they are beneath the electrical conductor, and therefore embedded beneath the surface of the HAMR transducer. The NFT 302 and chimney 306 are shown in this view merely for clarity but, in fact, are not visible. As mentioned above, the electrical conductor 402 may be gold, and serves for thermal conduction of heat over the region including the chimney 306, NFT 302 and peg 304, and it provides heat from resistive losses in the narrow section of the electrical conductor 402. The chimney 306 is substantially in line with the center of the NFT 302, and provides thermal connection to the electrical conductor 402.

FIG. 5B is a cross-section view of the exemplary embodiment shown in FIG. 5A. The electrical conductor 402.404 is at the surface of the encapsulating substrate of the HAMR transducer that includes the NFT 302 and peg 304, which have been fabricated and where the encapsulant may be ceramic, oxide or other insulating materials. The chimney 306, which may be a gold filled via in the insulating encapsulant, provides thermal contact to the electrical conductor 402 so that heat generated in the section 404 of the electrical conductor 402 is effectively transferred to the NFT 302 and peg 304, which may also be gold. The encapsulant may have a lower thermal conductivity, and thus serve to thermally insulate other components of a magnetic read/write assembly from thermal damage due to the annealing.

The electrical conductor 402 may be formed by depositing a conductive layer (preferably gold, due to its thermal conductivity) and patterning the electrical conductor 402 in a photolithographic process. The electrical conductor 402 is shown wider at the ends 406, so that the resistance is higher in the narrow section 404 of the electrical conductor 402. Therefore, an electrical current passing through the section 404 of the electrical conductor 402 will dissipate an amount of thermal power in proportion to its resistance, and the surrounding region of NFT 302, chimney 306, and encapsulating material will heat up. The low thermal impedance of the path from the electrical conductor 402 through the chimney 306 to the NFT 302 and peg 304 enables the NET 302, peg 304 and chimney 306 to get nearly as hot as the electrical conductor 402. At a sufficient temperature, the gold will anneal, which may reduce or prevent degradation of the structures in operational use. The low thermal conductivity of the encapsulating ceramics (e.g., $SiO_2$ and/or $Al_2O_3$) may contribute to confining the heat to the NFT 302, peg 304 and chimney 306, thus preventing damage to surrounding structures, such as the read and/or write poles, which may include, for example, hard baked photoresist that cannot withstand temperature required to anneal gold. The narrow section 404 of electrical conductor 402 may be on the order of 1 micron wide, and is narrower than the wider current carrying ends 406 of the electrical conductor 402, which is wide enough to dissipate less heat due to a lower path resistance that is proportional to the width. In practice, the actual dimension of the narrow section 404 of the electrical conductor 402 may vary, depending on the thickness of the metallization and the electrical current delivered to generate heat.

Passing an electrical current through a network of electrical conductors 402 may cause sufficient heating in the localized region beneath it to generate an annealing temperature only sufficient to affect the immediate chimney 304, NFT 302 and peg 306. Because of localization of the heating in the HAMR transducer localized near the NFT 302, the temperature of the hot region below the electrical conductor 402 will decrease with depth, shielding other components in the HAMR transducer from suffering heat damage. Furthermore, a bottom pole layer of the write pole in a read/write assembly may tend to heat sink its surroundings and prevent the read pole from experiencing damaging high temperatures.

After the anneal process, the electrical conductor 402, may be removed, for example, by chemical mechanical polishing (CMP), ion milling, or other suitable means, down to the encapsulant substrate surface, leaving the chimney 306 intact for heat sinking to other structural features during operational use of the HAMR transducer.

It may be appreciated that the embodiment described may achieve anneal temperatures for gold localized at the NFT 302, peg 304 and chimney 306 above 200° C. for greater structural stability without damaging the reader and hard baked photoresist in adjacent structures in a magnetic read/write pole.

Figure 6:
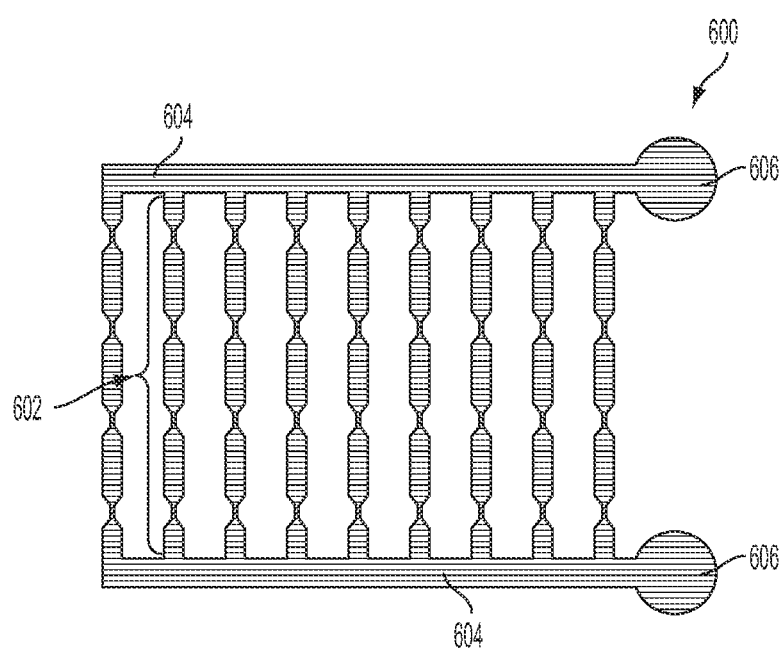
FIG. 6 is a plan view of an exemplary embodiment of an array of individual electrical conductors for annealing an array of NFT and chimneys in a batch manufacturing process.

During the manufacturing process, an array of HAMR transducers may be manufactured in bulk in a single wafer by means well known in the art. As shown in FIG. 6, an array 600 of individual electrical conductors 402 may be connected in series and parallel so that a broken or shorted conductor will not lead to a failure of annealing capability in an entire wafer containing a plurality of chimneys 306, NFTs 302 and pegs 304. As part of the process, after annealing, the array 600 may be removed by a chemical-mechanical-polish (CMP) step, ion milling step, or by some other suitable means. As described above, the array 600 may be formed by depositing and patterning a metal layer, such as gold to form the plurality of electrical conductors 402, A group of serially interconnected electrical conductors 402 may be arranged to form a group 602. A plurality of groups 602 may be arranged in parallel to form the array 600, wherein the groups are connected by summing traces 604 that connect to contacts 606. Current is applied to the array 600 at contacts 606. The current divides among the plurality of parallel groups 602. The divided current i flows through each of the serial electrical conductors 402 in a respective group 602. The power dissipation in each of the electrical conductors 402 is given by $i^2R$, with R being higher in the narrow sections 404 of the serially connected electrical conductors 402.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. An article of manufacture, comprising:
    a heat assisted magnetic recording (HAMR) transducer comprising a near field transducer (NFT) and a chimney thermally coupled to the NFT; and
    an electrical conductor arranged on the HAMR transducer, the electrical conductor having a section with a reduced width that is thermally coupled to the chimney.
2. The article of manufacture of claim 1, wherein the electrical conductor is configured to be coupled to an electrical current source, whereby the section of the electrical conductor generates heat.
3. The article of manufacture of claim 1, wherein the section of the electrical conductor is configured to thermally anneal the chimney.
4. The article of manufacture of claim 1, wherein the chimney is configured to thermally conduct heat to anneal the NFT.
5. The article of manufacture of claim 1, further comprising a peg arranged with the NFT, wherein the chimney is configured to thermally conduct heat to anneal the peg.
6. The article of manufacture of claim 1, wherein the section of the electrical conductor is further configured to thermally anneal the chimney at a temperature greater than 200° C.
7. The article of manufacture of claim 1, wherein each of the electrical conductor, chimney, and NFT comprises at least one of gold, gold alloy, silver alloy, and copper alloy.
8. An article of manufacture comprising:
    an array of heat assisted magnetic recording (HAMR) transducers, wherein each of the HAMR transducers comprises a near field transducer (NFT) and a chimney thermally coupled to the NFT; and
    an array of electrical conductors arranged with the array of HAMR transducers, wherein each of the electrical conductors comprises a section with a reduced width that is thermally coupled to a respective one of the chimneys.
9. The article of manufacture of claim 8, wherein the array of electrical conductors are configured to be coupled to a source of current, whereby the sections of the electrical conductors generate heat.
10. The article of manufacture of claim 8, wherein each of the sections of the electrical conductors is configured to thermally anneal its respective corresponding chimneys.
11. The article of manufacture of claim 8, wherein each of the chimneys is configured to thermally conduct heat to anneal its respective NFT.
12. The article of manufacture of claim 8, wherein each of the HAMR transducers further comprises a peg arranged with the NFT, wherein the chimney is configured to thermally conduct heat to anneal the peg.
13. The article of manufacture of claim 8, wherein each of the sections of the electrical conductors is further configured to thermally anneal its respective chimney at a temperature greater than 200° C.

14. The article of manufacture of claim 8, wherein each of the electrical conductors, chimneys, and NFTs comprises at least one of gold, gold alloy, silver alloy, and copper alloy.
15. A method of manufacturing an article of manufacture, wherein the article of manufacture comprises a heat assisted magnetic recording (HAMR) transducer having a near field transducer (NFT) and a chimney thermally coupled to the NFT, and wherein the article of manufacture further comprises an electrical conductor having a section with a reduced width that is thermally coupled to the chimney, the method comprising:
    applying an electrical current to the electrical conductor to generate heat in the section; and
    annealing the chimney and the NFT from the heat generated.
16. The method of claim 15, wherein the transducer comprises a peg arranged with the NFT, the method further comprising annealing the peg from the heat generated.
17. The method of claim 15, wherein the annealing comprises annealing the chimney and the NFT at a temperature greater than 200° C.
18. The method of claim 15, wherein each of the electrical conductors, chimneys, and NFTs comprises at least one of gold, gold alloy, silver alloy, and copper alloy.
19. The method of claim 15, further comprising removing at least a portion of the electrical conductor after the annealing.
20. The method of claim 19, wherein the removing includes one or more of chemical mechanical polishing (CMP) and ion milling.
21. A method of manufacturing an article of manufacture, wherein the article of manufacture comprises an array of heat assisted magnetic recording (HAMR) transducers each having a near field transducer (NFT) and a chimney thermally coupled to the NFT, and wherein the article of manufacture further comprises an array of electrical conductors arranged with the array of HAMR transducers with each of the electrical conductors having a section with a reduced width that is thermally coupled to a respective one of the chimneys, the method comprising:
    applying an electrical current to the electrical conductors to generate heat in their respective sections; and
    annealing the chimneys and the NFTs from the heat generated.
22. The method of claim 21, wherein each of the HAMR transducers comprises a peg arranged with the NFT, the method further comprising annealing each of the pegs from the heat generated.
23. The method of claim 21, wherein the annealing comprises annealing the chimneys and NFTs at a temperature greater than 200° C.
24. The method of claim 21, wherein each of the electrical conductors, chimneys, and NFTs comprises at least one of gold, gold alloy, silver alloy, and copper alloy.
25. The method of claim 21, further comprising removing at least a portion of the electrical conductors after the annealing.
26. The method of claim 25, wherein the removing includes one or more of chemical mechanical polishing (CMP) and ion milling.

* * * * *